US011816207B2

(12) United States Patent
Paixao

(10) Patent No.: US 11,816,207 B2
(45) Date of Patent: Nov. 14, 2023

(54) SYSTEMS AND METHODS FOR APPLICATION INTEGRATED MALICIOUS BEHAVIOR MITIGATION

(71) Applicant: Fortinet, Inc., Sunnyvale, CA (US)

(72) Inventor: Pedro Miguel Paixao, Sunrise, FL (US)

(73) Assignee: Fortinet, Inc., Sunnyvale, CA (US)

( * ) Notice: Subject to any disclaimer, the term of this patent is extended or adjusted under 35 U.S.C. 154(b) by 42 days.

(21) Appl. No.: 17/540,834

(22) Filed: Dec. 2, 2021

(65) Prior Publication Data
US 2023/0177147 A1   Jun. 8, 2023

(51) Int. Cl.
G06F 21/54 (2013.01)
G06F 21/53 (2013.01)
G06F 21/56 (2013.01)

(52) U.S. Cl.
CPC .............. *G06F 21/54* (2013.01); *G06F 21/53* (2013.01); *G06F 21/567* (2013.01); *G06F 2221/033* (2013.01)

(58) Field of Classification Search
CPC ........ G06F 21/54; G06F 21/53; G06F 21/567; G06F 2221/033
See application file for complete search history.

(56) References Cited

U.S. PATENT DOCUMENTS

| | | | |
|---|---|---|---|
| 2017/0228549 A1* | 8/2017 | Xuan | G06F 21/62 |
| 2019/0087574 A1* | 3/2019 | Schmidtler | H04L 63/1408 |
| 2020/0026850 A1* | 1/2020 | Levin | G06F 9/455 |
| 2020/0242251 A1* | 7/2020 | Wisgo | G06F 21/564 |
| 2021/0056200 A1* | 2/2021 | Rudnik | G06F 21/52 |
| 2022/0083644 A1* | 3/2022 | Kulshreshtha | G06N 20/00 |

* cited by examiner

*Primary Examiner* — Trong H Nguyen

(57) ABSTRACT

Various embodiments discussed generally relate to securing applications that work across networks, and more particularly to systems and methods for mitigating malicious behavior integrated within an application that directly calls a separate cloud based malicious behavior mitigation system.

20 Claims, 6 Drawing Sheets

SYSTEMS AND METHODS FOR APPLICATION INTEGRATED MALICIOUS BEHAVIOR MITIGATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to securing applications that work across networks, and more particularly to systems and methods for mitigating malicious behavior integrated within an application that directly calls a separate cloud based malicious behavior mitigation system.

BACKGROUND

In a typical network configuration a firewall or other network security device is relied upon to reduce the possibility of attacks on the network and devices and applications within the network. As such, applications can largely ignore network security concerns and rely upon the strength of the network security device to assure an attack is thwarted before it reaches the application. However, in some cases, applications are operated outside of a network security device, and such reliance on the existence of a network security device is problematic.

Thus, there exists a need in the art for more advanced approaches, devices and systems for identifying and protecting applications.

SUMMARY

Various embodiments discussed generally relate to securing applications that work across networks, and more particularly to systems and methods for mitigating malicious behavior integrated within an application that directly calls a separate cloud based malicious behavior mitigation system.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
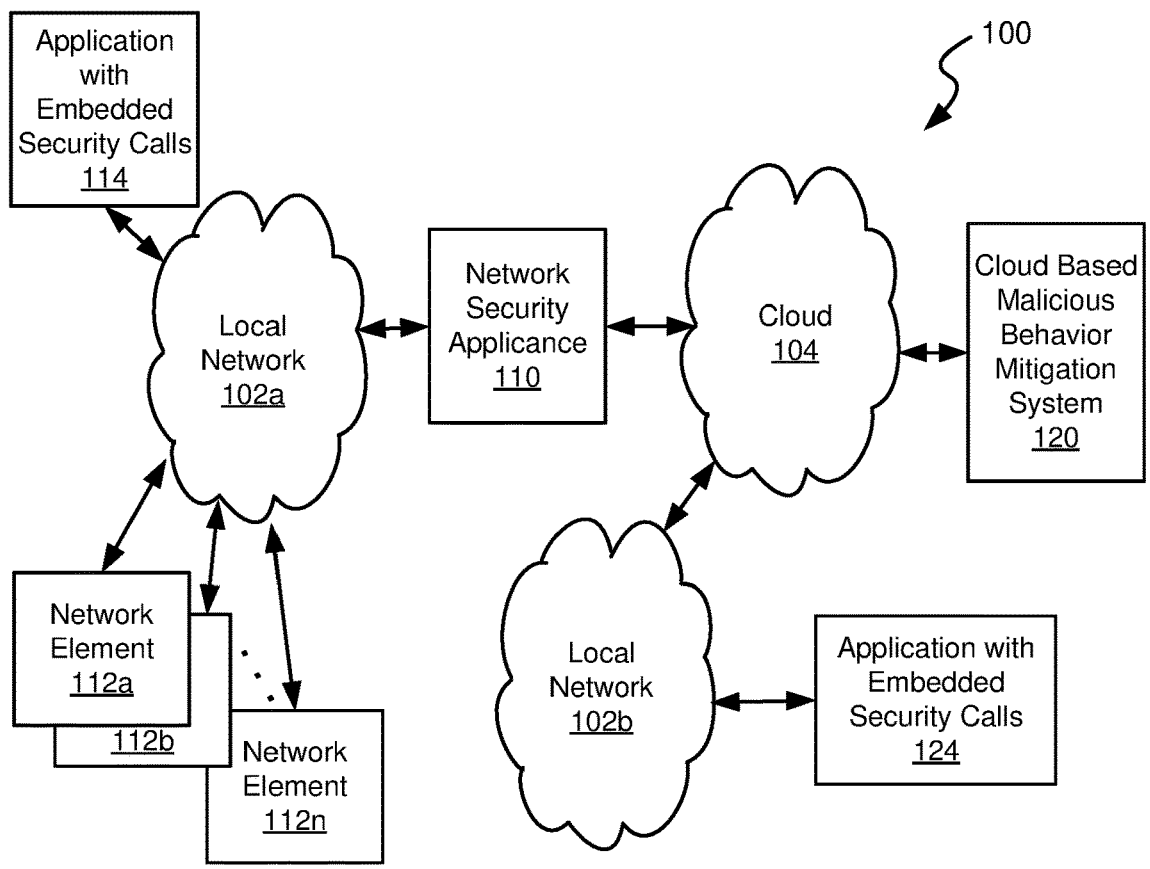
FIGS. 1A-1D illustrate a collection of interoperable networks each communicably connected to a cloud including a cloud based malicious behavior mitigation system callable by one or more applications each including embedded security calls designed to provide security functions via an API of the cloud based malicious behavior mitigation system in accordance with some embodiments.

Various embodiments discussed generally relate to securing applications that work across networks, and more particularly to systems and methods for mitigating malicious behavior integrated within an application that directly calls a separate cloud based malicious behavior mitigation system.

Currently network security functions are performed by dedicated hardware such as, for example, a hardware firewall that intercepts network traffic before such network traffic is received by an application executing within a network protected by the dedicated hardware. In some cases, the security functions have been implemented by a software agent such as, for example, a software firewall executing on the same hardware as the executing application. Such software agents operate substantially the same way that the aforementioned dedicated hardware works. In other cases, the security functions have been implemented by a software agent such as, for example, a software firewall executing on the same hardware as the executing application where the software agent accesses firewall functionality implemented in the cloud. Again, such a software agent works substantially the same as the aforementioned dedicated hardware where an entity separate from an application providing a defined function intercepts network traffic before such network traffic is received by the application. All of the aforementioned approached are limited and hardware specific.

Various embodiments provide network and data security services that are abstracted away from any particular hardware. Such embodiments provide a backbone of services that can be called directly from an application using a published application programming interface (API) for a cloud based malicious behavior mitigation system that implements one or more security functions and/or groups of security functions. Examples of such security functions include, but are not limited to: an antivirus function, a sandbox function, a web filter function, a IP reputation function, an IP security (IPS) function, an structured query language (SQL) injection detection function, an event correlation and content object detection function, and an indicators of compromise detection function. In some embodiments, access to the aforementioned functions via the cloud based malicious behavior mitigation system are offered as a function as a service (FAAS) that does not require installation, maintenance, or support of any of the functions by a user desiring to use the functions.

By providing access to the network and data security services of the cloud based malicious behavior mitigation system, an application developer can develop an application that integrates a degree of security. This application can then be compiled for any hardware rather than requiring specific hardware to implement the security functions. Such an approach provides the degree of security regardless of whether the application is executing on a network protected by a network security appliance or on a network that allows all traffic without concern for security. By integrating the security function into the application performing the function, an application developer is empowered to utilize the security features appropriate to the particular application, and no longer has to rely on a network administrator properly configuring a network security appliance and/or endpoint device. In some embodiments, the application can be designed to access the cloud based security features only when the application is operating in an insecure environment, and to operate without using access to the cloud based security features when the application is operating in a secure environment. A developer of the application does not need to manage servers, operating systems, network devices, or infrastructure, but rather can include a precompiled code set including calls to the cloud based malicious behavior mitigation system.

In some embodiments, the developed application includes a combination of calls to functions in the a cloud based malicious behavior mitigation system that effectively mimic protections that would be offered by, for example, a network firewall or other intrusion protection system or intrusion detection system. In various embodiments, the source code of the application may incorporate a pre-coded security package to which the function of the application can call when data is being received, processed, or transmitted. Such a pre-coded security package allows for the application developer to focus on developing the function of the application with only relatively limited thought to implementing network security as they rely on the pre-coded security package that is integrated into the source code for the application. Once incorporated, the source code for the application function is compiled along with the pre-coded security package to yield an executable application.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name System (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrase "network element" generally refers to any element that is accessible via computer network. Such elements may include, but are not limited to, a network appliance, a network device, a computing devices, an Internet of Things ("IoT") device, and/or network accessible application. Based upon the disclosure provided herein, one of ordinary skill in the art will recognize a variety of network elements that may be used in relation to different embodiments discussed herein.

As used herein, the phrase "network resources" is used in its broadest sense to mean any resource accessible within a network that is associated with one or more Internet Protocol (IP) addresses. Based upon the disclosure provided herein, one of ordinary skill in the art will recognize a variety of network resources that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Some embodiments provide methods for operating a hardware environment agnostic secure application. The methods include: executing, by a processing resource, a first set of instructions of an application, wherein the first set of instructions implement a purpose of an application; determining, by the processing resource, a transfer of information between the application and an external network element; executing, by the processing resource, a second set of instructions of the application, wherein the second set of instructions include at least one call to a security function implemented by a cloud based malicious behavior mitigation system; receiving, by the processing resource, a response from the cloud based malicious behavior mitigation system corresponding to the information; and processing, by the processing resource, the information based at least in part on the response.

In some instances of the aforementioned embodiments, the at least one call to the security function implemented by the cloud based malicious behavior mitigation system is made consistent with an application programming interface supported by the cloud based malicious behavior mitigation system. In various instances of the aforementioned embodiments, the at least one call to a security function implemented by the cloud based malicious behavior mitigation system is: a call for application of an antivirus function implemented by the cloud based malicious behavior mitigation system, a call for application of a sandbox function implemented by the cloud based malicious behavior mitigation system, a call for application of a web filter function implemented by the cloud based malicious behavior mitigation system, a call for application of an IP reputation function implemented by the cloud based malicious behavior mitigation system, a call for application of an IP security function implemented by the cloud based malicious behavior mitigation system, a call for application of a structured query language injection detection function implemented by the cloud based malicious behavior mitigation system, and/or a call for application of an event correlation and content object detection function implemented by the cloud based malicious behavior mitigation system.

In various instances of the aforementioned embodiments where the processing resource is a first processing resource, the methods further include compiling, by a second processing resource, a code to yield the application including both the first set of instructions and the second set of instructions. In some instances of the aforementioned embodiments, the second set of instructions are derived from an embedded, precompiled security processing module. In some such instances, the embedded, precompiled security processing module includes two or more security processes selected from the following: a call for application of an antivirus function implemented by the cloud based malicious behavior mitigation system, a call for application of a sandbox function implemented by the cloud based malicious behavior mitigation system, a call for application of a web filter function implemented by the cloud based malicious behavior mitigation system, a call for application of an IP reputation function implemented by the cloud based malicious behavior mitigation system, a call for application of an IP security function implemented by the cloud based malicious behavior mitigation system, a call for application of a structured query language injection detection function implemented by the cloud based malicious behavior mitigation system, and/or a call for application of an event correlation and content object detection function implemented by the cloud based malicious behavior mitigation system.

In various instances, the methods further include determining, by the processing resource, whether the application is deployed in a protected environment. In some such instances, executing, by the processing resource, the second set of instructions of the application; receiving, by the processing resource, the response from the cloud based malicious behavior mitigation system corresponding to the information; and processing, by the processing resource, the information based at least in part on the response are selectively disabled based upon the determination that the application is deployed in the protected environment. In some cases, the application is deployed in a network protected by a network security appliance, and where it is determined that the application is deployed in the protected environment based upon being deployed in the network protected by the network security appliance. In other cases, the application is a function application, wherein the processing resource is included on a hardware platform, wherein the hardware platform includes a security application running concurrently with the function application, and wherein it is determined that the application is deployed in the protected environment based upon the security application.

Other embodiments provide computer systems that include a processing resource and a non-transitory computer-readable medium. The non-transitory computer-readable medium is coupled to the processing resource, and has stored therein instructions that when executed by the processing resource cause the processing resource to: execute a first set of instructions of an application, wherein the first set of instructions implement a purpose of an application; determine a transfer of information between the application and an external network element; execute a second set of instructions of the application, wherein the second set of instructions include at least one call to a security function implemented by a cloud based malicious behavior mitigation system; receive a response from the cloud based malicious behavior mitigation system corresponding to the information; and process the information based at least in part on the response.

Yet other embodiments provide non-transitory computer-readable media each having stored therein instructions that when executed by the processing resource cause a processing resource to: execute a first set of instructions of an application, wherein the first set of instructions implement a purpose of an application; determine a transfer of information between the application and an external network element; execute a second set of instructions of the application, wherein the second set of instructions include at least one call to a security function implemented by a cloud based malicious behavior mitigation system; receive a response from the cloud based malicious behavior mitigation system corresponding to the information; and process the information based at least in part on the response.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, a collection of interoperable networks (i.e., local network 102a, and local network 102b) each communicably connected to a cloud 104 including a cloud based malicious behavior mitigation system 120 callable by one or more applications 114, 124 each including embedded security calls designed to provide security functions via an API of cloud based malicious behavior mitigation system 120 in accordance with some embodiments. Application 114 is connected to local area network 102a that is protected by a network security appliance 110. Network security appliance 110 also protects a number of other network elements (network elements 112a, 112b, 112n) maintained and operated in relation to local network 102a. In contrast, local network 102b is not protected by a network security appliance, and as such devices and applications operating in relation to local network 102b are exposed to some network traffic that a network security appliance may have blocked or otherwise rendered secure.

Local network 102a, local network 102b, and cloud 104 each may be any type of communication network known in the art. Those skilled in the art will appreciate that any of the aforementioned networks can be a wireless network, a wired network or a combination thereof that can be implemented as one of the various types of networks, such as an Intranet, a Local Area Network (LAN), a Wide Area Network (WAN), an Internet, and the like.

Applications 114, 124 are each executable applications that have security function calls to cloud based malicious behavior mitigation system 120 integrated with the application function. As such, applications 114, 124 may be hardware agnostic as they do not need to rely upon either a network security appliance protecting access to a network on which the application is operating or a separate software agent operating on the hardware device executing the application. The integrated security functions included in applications 114, 124 make calls to cloud based malicious behavior mitigation system 120 and receive security responses from cloud based malicious behavior mitigation system 120. The calls made by the security functions are made in accordance with a publicly known API of cloud based malicious behavior mitigation system 120.

Cloud based malicious behavior mitigation system 120 is a computer based system that provides a number of security functions. Such security functions may be those functions traditionally performed, for example, on a network appliance. Thus, the security functions may be one or more security functions currently provided on the Fortinet™ family of products including, but not limited to, FORTIGATE™, FORTIIVIAIL™, FORTIDB™, FORTIWEB™, FORTISCAN™, FORTIWIFI™, FORTISANDBOX™, FORTISIEM™, and/or FORTIDDOS™. Some such security functions include, but are not limited to, a virus detection function, a virus removal function, an internet intrusion protection function, a sandbox function, a uniform record locator (URL) reputation function (also known as IP reputation), a structured query language (SQL) injections function, an event correlation and context objects function, and/or an indicators of compromise function. Access to such functions may be based upon use of some type of identification from the calling application 114, 124 to cloud based malicious behavior mitigation system 120 that allows for quantifying the number of functions used and in some cases charges on a subscription or per function basis.

Figure 1D:
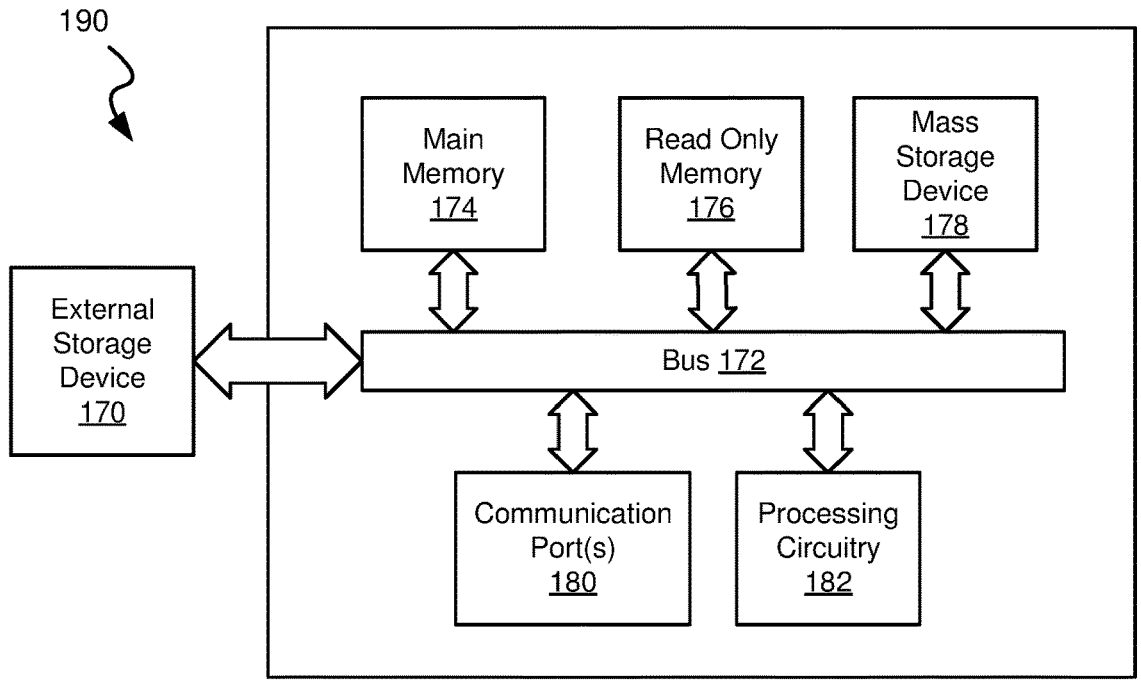
Figure 1B:
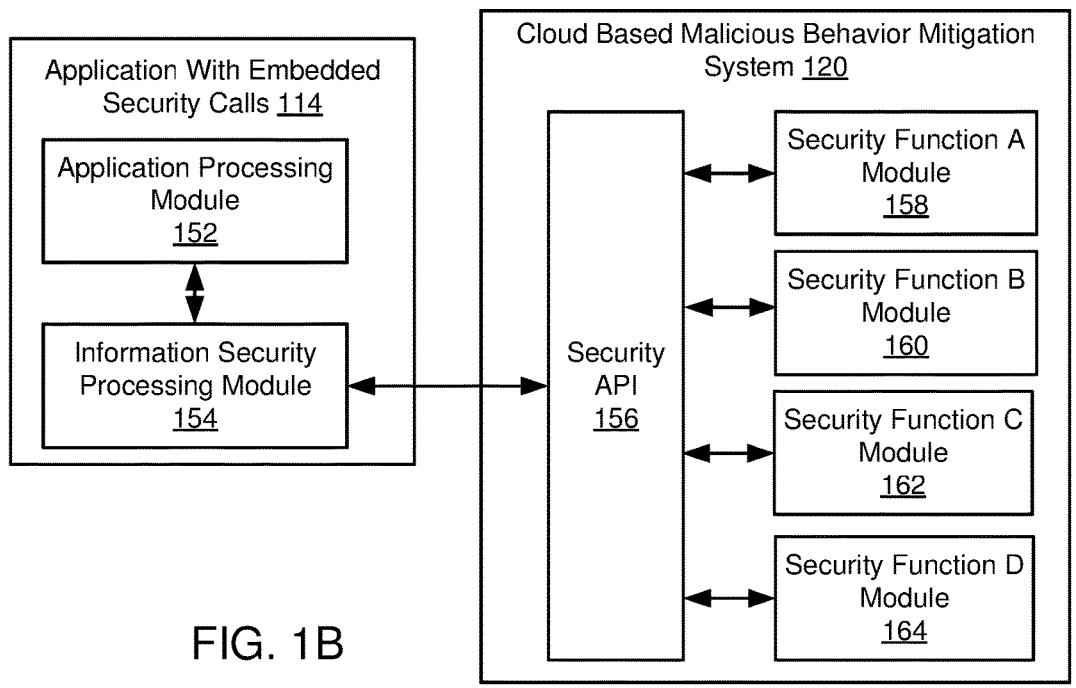

Turning to FIG. 1B, a block diagram 150 shows a combination of an application 114 and cloud based malicious behavior mitigation system 120. As shown, application 114 includes an application processing module 152 and an information security processing module 154. Application processing module 152 includes the logic to perform the purpose of the application. Thus, for example, if application 114 is a credit card processing application, application processing module 152 would include instructions for performing the task of credit card processing. As another example, if application 114 is a ticket reservation application, application processing module 152 would include instructions for performing the task of ticket reservation. Based upon the disclosure provided herein, one of ordinary skill in the art will recognize a variety of application functions that may be performed by different embodiments of application 114 (and application 124).

In addition, application processing module 152 interacts with information security processing module 154. For example, when application processing module 152 is executing commands to receive data from a network element, it makes one or more calls to information security processing module 154. Thus, for example, information security processing module 154 may be implemented as a software subroutine, clean_data(input), which operates to check the incoming data (i.e., input) for any virus and to remove any virus that it finds. The subroutine in turn calls a virus detection function of cloud based malicious behavior mitigation system 120, and where that function indicates detection of a virus, the subroutine in turn calls a virus removing function of cloud based malicious behavior mitigation system 120 which returns the data virus free. In turn, the subroutine returns the cleaned data to application processing module 152 where it is used as part of function of application 114. Based upon the disclosure provided herein, one of ordinary skill in the art will recognize a variety of combinations and/or individual security function calls that may be made by information security processing module 154 of application 114.

Figure 1C:
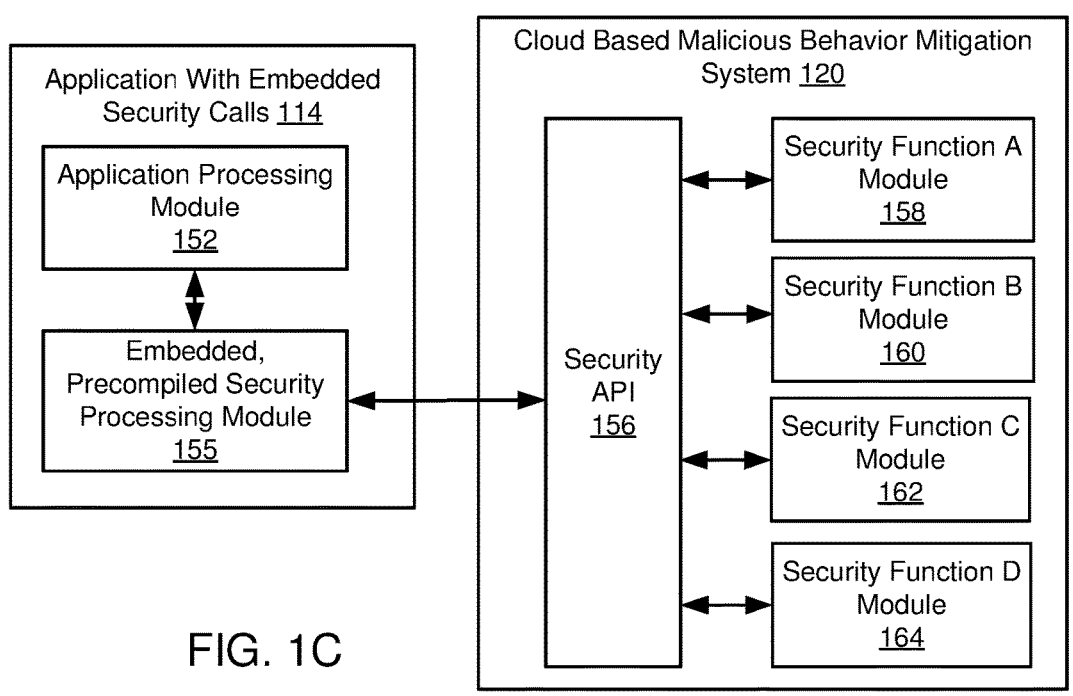

In some embodiments, information security processing module 154 may be a suite of security functions that are included in a pre-coded security package which can be called by application processing module 152 when data is being received, processed, or transmitted by application 114. Such a pre-coded security package allows for the application developer to focus on developing the function of the application with only relatively limited thought to implementing network security as they rely on the pre-coded security package that is integrated into the source code for the application. In some cases, the aforementioned pre-coded security package is an embedded, precompiled security processing module 155 similar to that shown in relation to FIG. 1C. Once incorporated, the source code for the application function is compiled along with the pre-coded security package and/or embedded, precompiled security processing module 155 to yield an executable application.

Security function calls from application 114 are made to cloud based malicious behavior mitigation system 120 via a publicly known security API 156. Such a publicly known security API 156 defines commands and corresponding inputs and outputs for security functions supported by cloud based malicious behavior mitigation system 120. Based upon the disclosure provided herein, one of ordinary skill in the art will recognize that each security function may require different inputs and/or provide different outputs, and that such an API would be designed specific to each function and/or function set offered by the particular implementation of cloud based malicious behavior mitigation system 120.

In this embodiment, security API 156 provides a defined interface to four separate security functions: security function A module 158, security function B module 160, security function C module 162, and security function D module 164. Each of security function A module 158, security function B module 160, security function C module 162, and security function D module 164 provide different security functions that may be selected from, but are not limited to, a virus detection function, a virus removal function, an internet intrusion protection function, a sandbox function, a URL reputation function, an SQL injections function, an event correlation and context objects function, and/or an indicators of compromise function. Based upon the disclosure provided herein, one of ordinary skill in the art will recognize other security functions and/or sets of security functions that may be implemented as one of security function A module 158, security function B module 160, security function C module 162, and security function D module 164 in accordance with different embodiments. Further, while four security function modules are shown in the embodiment, one of ordinary skill in the art will recognize that more or fewer than four security function modules may be included in different implementations of cloud based malicious behavior mitigation system 120. Each of security function A module 158, security function B module 160, security function C module 162, and security function D module 164 receives some input, performs its defined security function, and returns a result.

Turning to FIG. 1D, an example computer system 190 is shown in which or with which embodiments of the present disclosure may be utilized. As shown in FIG. 1D, computer system 190 includes an external storage device 170, a bus 172, a main memory 174, a read-only memory 176, a mass storage device 178, one or more communication ports 180, and one or more processing resources (e.g., processing circuitry 182). In one embodiment, computer system 190 may represent some portion of a computer on which applications 114, 124 may be executing, and/or a computer on which cloud based malicious behavior mitigation system 120 is deployed.

Those skilled in the art will appreciate that computer system 190 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
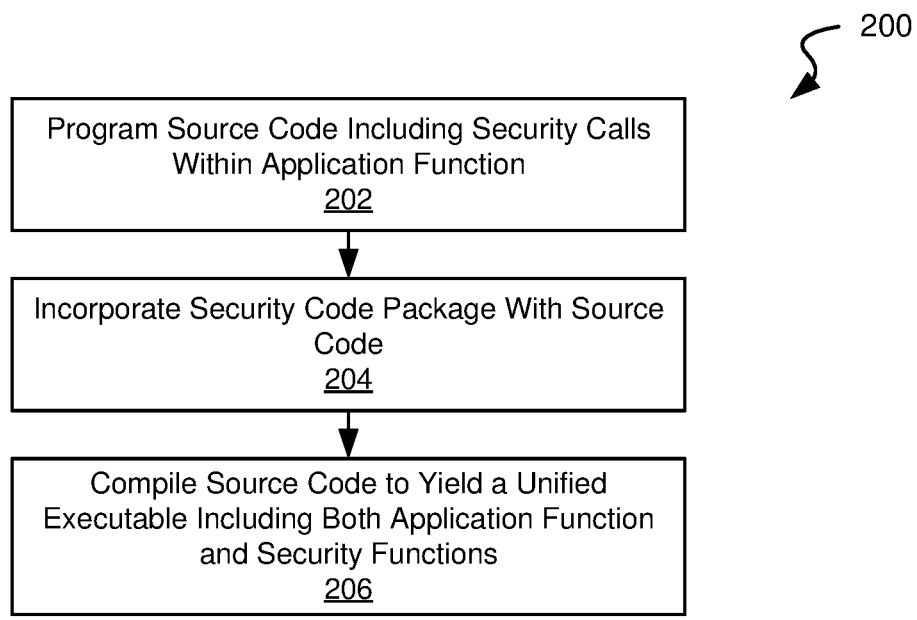
FIG. 2 is a flow diagram showing a method in accordance with some embodiments for generating an executable application including both executable code for performing the function of the application and executable code for performing security processes in relation to support the function of the application where the security processes are implemented as calls directly from the executable code to a cloud security service.

Turning to FIG. 2, a flow diagram 200 shows a method in accordance with some embodiments for generating an executable application including both executable code for performing the function of the application and executable code for performing security processes in relation to support the function of the application where the security processes are implemented as calls directly from the executable code to a cloud security service. Following flow diagram 200, source code is programmed (block 202). The programmed source code includes both logic to implement a desired function of an application and logic to perform network security to protect the application from malicious attacks. The logic to implement the desired function of the application may include, for example, credit card processing logic where the purpose of the application includes credit card processing and/or ticket reservation where the purpose of the application includes ticket reservations. Based upon the disclosure provided herein, one of ordinary skill in the art will recognize a variety of application purposes that may be programmed.

The logic to perform the network security includes software or firmware instructions that are designed to limit access to the application. In some cases, such instructions are included in the programming where information is to be received, processed, and/or transmitted to/from network sources. Such instructions may include calls to one or more information security processes. The one or more information security processes are included in a security code package that is incorporated in the source code developed by the application developer (block 204).

The incorporated security code package include information security source code (in some cases, precompiled). The information security source code, precompiled or not, includes calls to a cloud based malicious behavior mitigation system, and the actual security function is performed by the cloud based malicious behavior mitigation system. The calls to the cloud based malicious behavior mitigation system provide and/or receive information between the application and the cloud based malicious behavior mitigation system in accordance with a publicly defined API. As an example, data received by the application may be provided to the cloud based malicious behavior mitigation system along with an API defined command to perform a virus check on the data. In turn, the cloud based malicious behavior mitigation system returns either an indication that the data is free from any virus or data that has been modified to remove a virus is returned to the application from the cloud based malicious behavior mitigation system in accordance with the API. Such an API and corresponding cloud based malicious behavior mitigation system allows an application developer to incorporate sophisticated information security features into their application, and thereby be able to deploy the application in environments that are not themselves protected from malicious behavior.

The source code including the information security source code (precompiled or not) is compiled to yield a unified application that performs the desired application function and calls any desired security functions (block 206). Again, the security functions are performed by the cloud based malicious behavior mitigation system in response to calls from the application where the calls are received and responded to in accordance with a publicly defined API. Such an API and corresponding cloud based malicious behavior mitigation system allows an application developer to incorporate sophisticated information security features into their application, and thereby be able to deploy the application in environments that are not themselves protected from malicious behavior.

Figure 3:
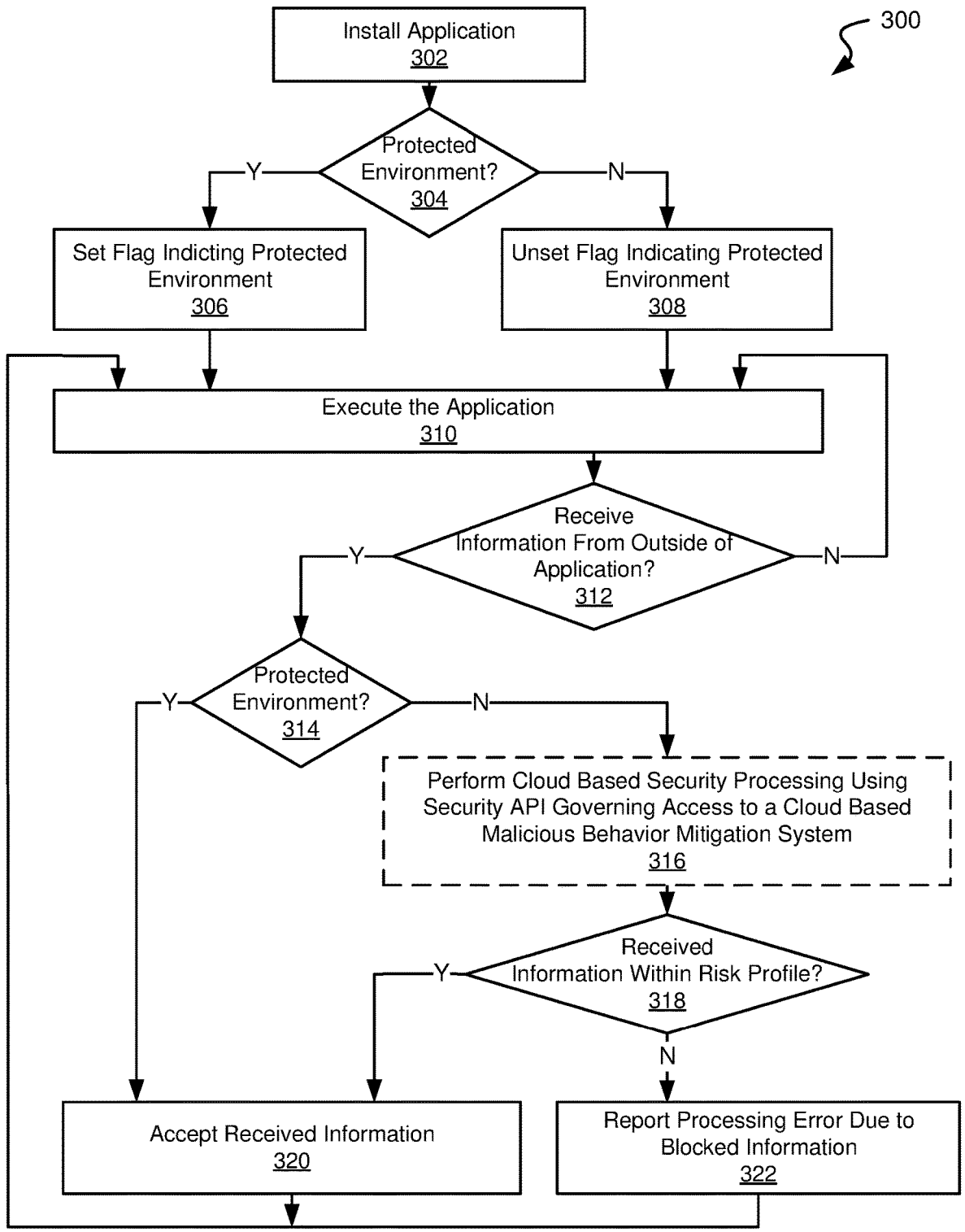
FIG. 3 is a flow diagram showing a method in accordance with various embodiments for performing security functions within an application by accessing a cloud based malicious behavior mitigation system via an API.

Turning to FIG. 3, a flow diagram 300 shows a method in accordance with various embodiments for performing security functions within an application by accessing a cloud based malicious behavior mitigation system via an API. Following flow diagram 300, an application is installed on a hardware platform (block 302). The application includes software or firmware instructions executable by a processor of the hardware platform to perform the function of the application. The function of the application includes both a desired function and various calls to security functions implemented on a cloud based malicious behavior mitigation system. In some embodiments, the calls to security functions implemented on a cloud based malicious behavior mitigation system are configured to apply network security to information that is received, processed, and/or transmitted between the application and network sources. By including the security calls in the software or firmware instructions of the application, the application can be deployed in any environment, and does not necessarily require a secure network environment.

It is determined whether the application has been installed in a protected environment (block 304). This may be determined, for example, by asking a user installing the application whether it is on a network protected by a network security appliance having adequate protections to protect the application, or where a security software application is running alongside the application that provides network security. Based upon the disclosure provided herein, one of ordinary skill in the art will recognize a variety of ways, either automatic or manual, in which it can be determined whether the application is installed in a protected environment.

Where then application is installed in a protected environment, a flag is set indicating the protected environment (block 306). Otherwise the flag indicating the protected environment is unset (block 308). In a protected environment one or more of the security calls incorporated in the application may be duplicative of security functions being performed by, for example a network security appliance or security software running alongside the application. In such a situation, it may be desirable to disable use of the security calls in the application where, for example, the calls incur a charge on a per access basis to the cloud based malicious behavior mitigation system.

Once installed, the application is executed to perform the function of the application (block 310). When it is determined during execution that information is transferring between the application and other network elements (block 312) and the application is operating in a protected environment (block 314), security processing calls of the application to the cloud based malicious behavior mitigation system are not performed, but rather the information is simply accepted (block 320). This allows for utilizing the application in a protected environment without incurring external costs of information security.

Alternatively, when it is determined during execution that information is transferring between the application and other network elements (block 312) and the application is not operating in a protected environment (block 314), cloud bases security processing is performed by making calls to one or more security functions supported by the cloud based malicious behavior mitigation system in accordance with a publicly defined API (block 316). Block 316 is shown in dashed lines as multiple examples of the aforementioned cloud based security processing are discussed below in relation to FIGS. 4-5.

Figure 4:
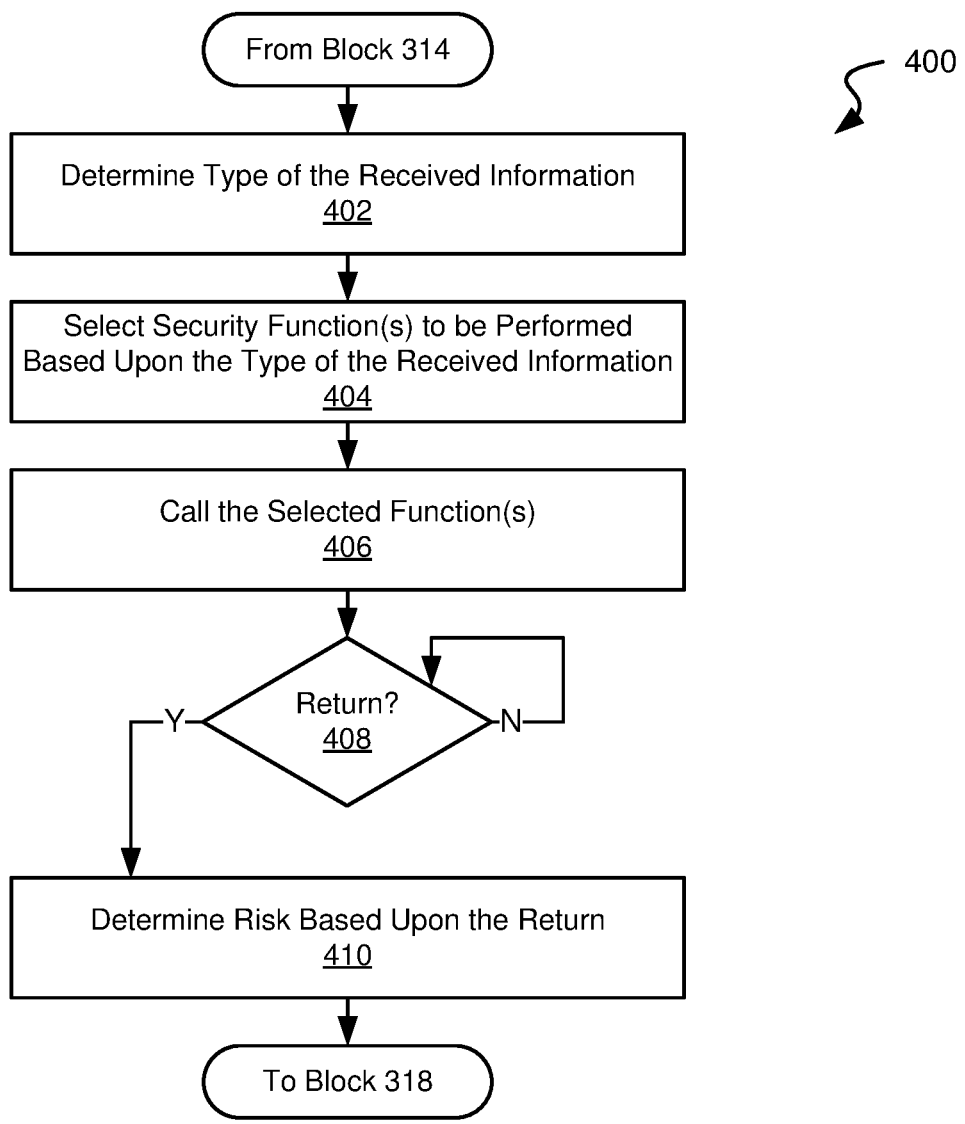
FIGS. 4-5 are each flow diagrams showing methods in accordance with respective embodiments for implementing security processing using code embedded in an application to access one or more functions of a cloud based malicious behavior mitigation system via an API.

Turning to FIG. 4, a flow diagram 400 shows a method for cloud based security processing that may be used in relation to some embodiments. Following flow diagram 400, the type of information being received from a network element is determined (block 402). Many different types of information including, but not limited to, images, documents, executables, and/or the like may be received and the different types of data may warrant application of different types of security functions as is known in the art. One or more security functions relevant to the type of data are selected (block 404), and the one or more selected security functions are called (block 406). Calls to the one or more security functions include providing a request to the cloud based malicious behavior mitigation system in accordance with a definition for the request that is published for an API supported by the cloud based malicious behavior mitigation system.

A response from the cloud based malicious behavior mitigation system is awaited (block 408). The received response is in accordance with the definition for the request that is published for the API supported by the cloud based malicious behavior mitigation system. The response is processed by the application to determine a risk of the information that was received (block 410). As an example, where the request was for a virus check and the response indicates a high likelihood of a virus included in the information, a high risk value may be assigned to the received information. As another example, where the request was for a virus elimination and the response includes the information after removal of a virus and indication that no other viruses were found, a low risk value may be assigned to the received information. Based upon the disclosure provided herein, one of ordinary skill in the art will recognize a variety of risk assessments that may be attached to information based upon a response from the cloud based malicious behavior mitigation system.

Returning to FIG. 3, the risk assessed based upon the response from the cloud based malicious behavior mitigation system is compared with a risk profile for the application (block 318). Where the assessed risk is within the risk profile (block 318), the received information (either that originally received or that returned from the cloud based malicious behavior mitigation system depending upon the particular security function(s) that were called) is accepted. Alternative, where the assessed risk is outside of the risk profile (block 318), the received information (either that originally received or that returned from the cloud based malicious behavior mitigation system depending upon the particular security function(s) that were called) is not accepted and a processing error due to the blocked information is reported by the application (block 322).

Figure 5:
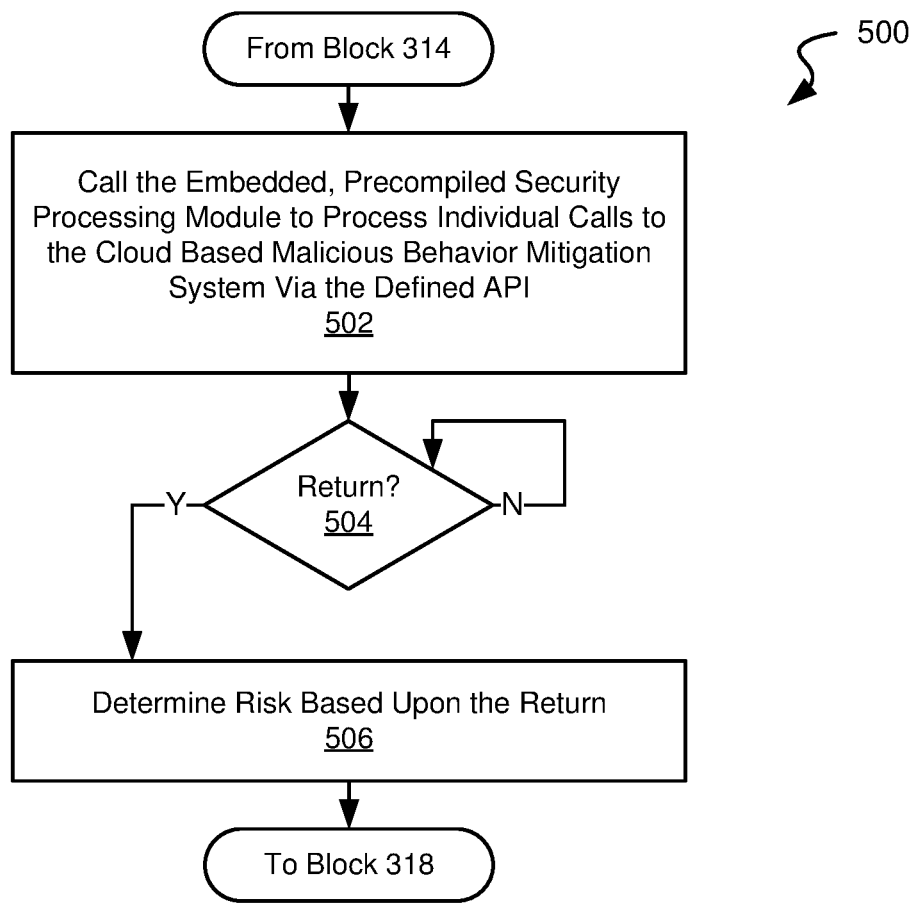

Turning to FIG. 5, a flow diagram 500 shows another method for cloud based security processing that may be used in place of block 316 of FIG. 3 in relation to other embodiments. Following flow diagram 500, an embedded, precompiled security processing module of the application is called (block 502). The embedded, precompiled security processing module includes a pre-designed security approach. Upon being called and provided received information, the embedded, precompiled security processing module executes one or more calls to perform a security analysis and/or security mitigation for the received information. The security analysis and/or security mitigation is effectuated by calling one or more security functions implemented in the cloud based malicious behavior mitigation system in accordance with a published API supported by the cloud based malicious behavior mitigation system. As an example, embedded, precompiled security processing module may perform similar to that of a commercially available network security appliance. By using such an embedded, precompiled security processing module, an application developer is left substantially free to focus on the desired purpose of the application, and only needs to include calls to the embedded, precompiled security processing module for information transferred between the application and another network element. The embedded, precompiled security processing module performs security process with little or no modification by the application developer.

A response from embedded, precompiled security processing module is received (block 408). The response from embedded, precompiled security processing module may be any of: (1) a response received from the cloud based malicious behavior mitigation system called by the embedded, precompiled security processing module, (2) an amalgam of two or more responses from the cloud based malicious behavior mitigation system called by the embedded, precompiled security processing module, (3) a processed risk value based upon one or more responses from the cloud based malicious behavior mitigation system called by the embedded, precompiled security processing module. The response is processed by the application to determine a risk of the information that was received (block 506). As an example, where the request was for a virus check and the response indicates a high likelihood of a virus included in the information, a high risk value may be assigned to the received information. As another example, where the request was for a virus elimination and the response includes the information after removal of a virus and indication that no other viruses were found, a low risk value may be assigned to the received information. Based upon the disclosure provided herein, one of ordinary skill in the art will recognize a variety of risk assessments that may be attached to information based upon a response from the cloud based malicious behavior mitigation system. Processing then proceeds as previously described in relation to blocks 318-322 of FIG. 3.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for operating a hardware environment agnostic secure application, the method comprising:
  executing, by a processing resource, a first set of instructions of an application, wherein the first set of instructions implement a purpose of the application;
  determining, by the processing resource, a transfer of information between the application and an external network element;
  determining, by the processing resource, whether the application is deployed in a protected environment;
  executing, by the processing resource, a second set of instructions of the application, wherein the second set of instructions include at least one call to a security function implemented by a cloud based malicious behavior mitigation system;
  receiving, by the processing resource, a response from the cloud based malicious behavior mitigation system corresponding to the information;
  processing, by the processing resource, the information based at least in part on the response; and
  wherein: the executing, by the processing resource, the second set of instructions of the application, the receiving, by the processing resource, the response from the cloud based malicious behavior mitigation system corresponding to the information, and the processing, by the processing resource, the information based at least in part on the response are selectively disabled based upon the determination that the application is deployed in the protected environment.

2. The method of claim 1, wherein the at least one call to the security function implemented by the cloud based malicious behavior mitigation system is made consistent with an application programming interface supported by the cloud based malicious behavior mitigation system.

3. The method of claim 1, wherein the at least one call to the security function implemented by the cloud based malicious behavior mitigation system is selected from a group consisting of:
  a call for application of an antivirus function implemented by the cloud based malicious behavior mitigation system,
  a call for application of a sandbox function implemented by the cloud based malicious behavior mitigation system,
  a call for application of a web filter function implemented by the cloud based malicious behavior mitigation system,
  a call for application of an IP reputation function implemented by the cloud based malicious behavior mitigation system,
  a call for application of an IP security function implemented by the cloud based malicious behavior mitigation system,
  a call for application of a structured query language injection detection function implemented by the cloud based malicious behavior mitigation system, and
  a call for application of an event correlation and content object detection function implemented by the cloud based malicious behavior mitigation system.

4. The method of claim 1, wherein the processing resource is a first processing resource, the method further comprising:
  compiling, by a second processing resource, a code to yield the application including both the first set of instructions and the second set of instructions.

5. The method of claim 1, wherein the second set of instructions are derived from an embedded, precompiled security processing module.

6. The method of claim 5, wherein the embedded, precompiled security processing module includes two or more security processes selected from a group consisting of:
  a call for application of an antivirus function implemented by the cloud based malicious behavior mitigation system,
  a call for application of a sandbox function implemented by the cloud based malicious behavior mitigation system,
  a call for application of a web filter function implemented by the cloud based malicious behavior mitigation system,
  a call for application of an IP reputation function implemented by the cloud based malicious behavior mitigation system,
  a call for application of an IP security function implemented by the cloud based malicious behavior mitigation system,
  a call for application of a structured query language injection detection function implemented by the cloud based malicious behavior mitigation system, and
  a call for application of an event correlation and content object detection function implemented by the cloud based malicious behavior mitigation system.

7. The method of claim 1, wherein the application is deployed in a network protected by a network security appliance, and wherein it is determined that the application is deployed in the protected environment based upon being deployed in the network protected by the network security appliance.

8. The method of claim 1, wherein the application is a function application, wherein the processing resource is included on a hardware platform, wherein the hardware platform includes a security application running concurrently with the function application, and wherein it is determined that the application is deployed in the protected environment based upon the security application.

9. A computer system, the computer system comprising:
a processing resource;
a non-transitory computer-readable medium, coupled to the processing resource, having stored therein instructions that when executed by the processing resource cause the processing resource to:
execute a first set of instructions of an application, wherein the first set of instructions implement a purpose of the application;
determine a transfer of information between the application and an external network element;
determine whether the application is deployed in a protected environment;
execute a second set of instructions of the application, wherein the second set of instructions include at least one call to a security function implemented by a cloud based malicious behavior mitigation system, wherein the executing the second set of instructions of the application is selectively disabled based upon the determination that the application is deployed in the protected environment;
receive a response from the cloud based malicious behavior mitigation system corresponding to the information, wherein the receiving the response from the cloud based malicious behavior mitigation system corresponding to the information is selectively disabled based upon the determination that the application is deployed in the protected environment; and
process the information based at least in part on the response, wherein the processing the information is selectively disabled based upon the determination that the application is deployed in the protected environment.

10. The system of claim 9, wherein the at least one call to the security function implemented by the cloud based malicious behavior mitigation system is made consistent with an application programming interface supported by the cloud based malicious behavior mitigation system.

11. The system of claim 9, wherein the at least one call to the security function implemented by the cloud based malicious behavior mitigation system is selected from a group consisting of:
a call for application of an antivirus function implemented by the cloud based malicious behavior mitigation system,
a call for application of a sandbox function implemented by the cloud based malicious behavior mitigation system,
a call for application of a web filter function implemented by the cloud based malicious behavior mitigation system,
a call for application of an IP reputation function implemented by the cloud based malicious behavior mitigation system,
a call for application of an IP security function implemented by the cloud based malicious behavior mitigation system,
a call for application of a structured query language injection detection function implemented by the cloud based malicious behavior mitigation system, and
a call for application of an event correlation and content object detection function implemented by the cloud based malicious behavior mitigation system.

12. The system of claim 9, wherein the second set of instructions are derived from an embedded, precompiled security processing module.

13. The system of claim 12, wherein the embedded, precompiled security processing module includes two or more security processes selected from a group consisting of:
a call for application of an antivirus function implemented by the cloud based malicious behavior mitigation system,
a call for application of a sandbox function implemented by the cloud based malicious behavior mitigation system,
a call for application of a web filter function implemented by the cloud based malicious behavior mitigation system,
a call for application of an IP reputation function implemented by the cloud based malicious behavior mitigation system,
a call for application of an IP security function implemented by the cloud based malicious behavior mitigation system,
a call for application of a structured query language injection detection function implemented by the cloud based malicious behavior mitigation system, and
a call for application of an event correlation and content object detection function implemented by the cloud based malicious behavior mitigation system.

14. The system of claim 9, wherein the computer system is deployed in a network protected by a network security appliance, and wherein it is determined that the computer system is deployed in the protected environment based upon being deployed in the network protected by the network security appliance.

15. The system of claim 9, wherein the computer system is concurrently executing a security application, and wherein it is determined that the computer system is deployed in the protected environment based upon the security application.

16. A non-transitory computer-readable medium having stored therein instructions that when executed by a processing resource cause the processing resource to:
execute a first set of instructions of an application, wherein the first set of instructions implement a purpose of the application;
determine a transfer of information between the application and an external network element;
determine whether the application is deployed in a protected environment;
execute a second set of instructions of the application, wherein the second set of instructions include at least one call to a security function implemented by a cloud based malicious behavior mitigation system, wherein the executing the second set of instructions of the application is selectively disabled based upon the determination that the application is deployed in the protected environment;
receive a response from the cloud based malicious behavior mitigation system corresponding to the information, wherein the receiving the response from the cloud based malicious behavior mitigation system corresponding to the information is selectively disabled based upon the determination that the application is deployed in the protected environment; and process the information based at least in part on the response, wherein the processing the information is selectively disabled based upon the determination that the application is deployed in the protected environment.

17. The non-transitory computer-readable medium of claim 16, wherein the at least one call to the security function implemented by the cloud based malicious behavior mitigation system is made consistent with an application programming interface supported by the cloud based malicious behavior mitigation system.

18. The non-transitory computer-readable medium of claim 16, wherein the at least one call to the security function implemented by the cloud based malicious behavior mitigation system is selected from a group consisting of:

a call for application of an antivirus function implemented by the cloud based malicious behavior mitigation system, a call for application of a sandbox function implemented by the cloud based malicious behavior mitigation system, a call for application of a web filter function implemented by the cloud based malicious behavior mitigation system, a call for application of an IP reputation function implemented by the cloud based malicious behavior mitigation system, a call for application of an IP security function implemented by the cloud based malicious behavior mitigation system, a call for application of a structured query language injection detection function implemented by the cloud based malicious behavior mitigation system, and a call for application of an event correlation and content object detection function implemented by the cloud based malicious behavior mitigation system.

19. The non-transitory computer-readable medium of claim 16, wherein the application is deployed in a network protected by a network security appliance, and wherein it is determined that the application is deployed in the protected environment based upon being deployed in the network protected by the network security appliance.

20. The non-transitory computer-readable medium of claim 16, wherein the application is a function application, wherein the processing resource is included on a hardware platform, wherein the hardware platform includes a security application running concurrently with the function application, and wherein it is determined that the application is deployed in the protected environment based upon the security application.

* * * * *